United States Patent
Gil et al.

(10) Patent No.: US 9,582,187 B2
(45) Date of Patent: Feb. 28, 2017

(54) DYNAMIC CONTEXT BASED MENUS

(75) Inventors: Erez Kikin Gil, Redmond, WA (US); Matthew Kotler, Sammamish, WA (US); Vignesh Sachidanandam, Mercer Island, WA (US); Mark Pearson, Renton, WA (US); Andrew Hockman, Seattle, WA (US); Ned Friend, Seattle, WA (US); Doreen Grieb, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1449 days.

(21) Appl. No.: 13/289,272

(22) Filed: Nov. 4, 2011

(65) Prior Publication Data

US 2013/0019182 A1 Jan. 17, 2013

Related U.S. Application Data

(60) Provisional application No. 61/507,983, filed on Jul. 14, 2011.

(51) Int. Cl.
*G06F 3/048* (2013.01)
*G06F 3/0488* (2013.01)
*G06F 3/0482* (2013.01)

(52) U.S. Cl.
CPC ......... *G06F 3/04886* (2013.01); *G06F 3/0482* (2013.01); *G06F 3/04883* (2013.01); *G06F 2203/04807* (2013.01)

(58) Field of Classification Search
CPC ..... G06F 3/017; G06F 3/0482; G06F 3/04842
(Continued)

(56) References Cited

U.S. PATENT DOCUMENTS 6,281,879 B1  8/2001  Graham
6,542,164 B2  4/2003  Graham
(Continued)

FOREIGN PATENT DOCUMENTS

CN  1577232 A  2/2005
CN  1790242 A  6/2006
(Continued)

OTHER PUBLICATIONS

"Office Action and Search Report Issued in Taiwan Patent Application No. 101122444", Mailed Date: Nov. 17, 2015, 14 Pages.
(Continued)

*Primary Examiner* — Ajay Bhatia
*Assistant Examiner* — Phuong Nguyen
(74) *Attorney, Agent, or Firm* — Monica Adjemian; Tom Wong; Micky Minhas

(57) ABSTRACT

Context based menus that can be dynamically positioned, laid out, and activated are provided for tap, swipe, and press-and-hold type interactions. Presenting a plurality of executable commands and/or links to submenus, a context based menu may be displayed in various shapes and forms in relation to selected content displayed on a user interface and/or other factors such as available display space, user attributes, and similar ones. Submenus presenting commands within a category may be displayed in place of, adjacent to, or overlapping with a parent context based menu. Menu position, contents, and/or shape may be adjusted in response to changes in selected content, user contact location, changes in user interface, and the like.

20 Claims, 17 Drawing Sheets

(58) Field of Classification Search
USPC .......... 715/825, 841, 810, 828, 829, 834
See application file for complete search history.

(56) References Cited

U.S. PATENT DOCUMENTS

| | | | |
|---|---|---|---|
| 6,828,988 | B2 | 12/2004 | Hudson et al. |
| D563,972 | S | 3/2008 | Sherry |
| 7,533,340 | B2 | 5/2009 | Hudson et al. |
| 7,533,352 | B2 | 5/2009 | Chew et al. |
| 7,570,943 | B2 | 8/2009 | Sorvari et al. |
| 7,710,409 | B2 | 5/2010 | Robbin et al. |
| 7,712,049 | B2 | 5/2010 | Williams et al. |
| 7,834,861 | B2 | 11/2010 | Lee |
| 7,895,531 | B2 | 2/2011 | Radtke et al. |
| 8,239,882 | B2 | 8/2012 | Dhanjal et al. |
| 8,245,156 | B2 | 8/2012 | Mouilleseaux et al. |
| 2003/0112278 | A1* | 6/2003 | Driskell ............. G06F 3/0481 715/788 |
| 2005/0216834 | A1 | 9/2005 | Gu |
| 2007/0055936 | A1 | 3/2007 | Dhanjal et al. |
| 2007/0168890 | A1 | 7/2007 | Zhao et al. |
| 2007/0180392 | A1† | 8/2007 | Russo |
| 2007/0256029 | A1 | 11/2007 | Maxwell |
| 2007/0271522 | A1 | 11/2007 | Son et al. |
| 2007/0271528 | A1† | 11/2007 | Park et al. |
| 2008/0036743 | A1 | 2/2008 | Westerman et al. |
| 2008/0222569 | A1 | 9/2008 | Champion et al. |
| 2009/0007012 | A1 | 1/2009 | Mandic et al. |
| 2009/0037813 | A1 | 2/2009 | Newman et al. |
| 2009/0083665 | A1* | 3/2009 | Anttila ............. G06F 3/0482 715/834 |
| 2009/0295743 | A1 | 12/2009 | Nakajoh |
| 2009/0327963 | A1* | 12/2009 | Mouilleseaux ..... G06F 3/04883 715/834 |
| 2009/0328101 | A1 | 12/2009 | Suomela et al. |
| 2010/0122160 | A1 | 5/2010 | Chirakansakcharoen et al. |
| 2010/0122194 | A1 | 5/2010 | Rogers |
| 2010/0192102 | A1† | 7/2010 | Chmielewski et al. |
| 2010/0299637 | A1 | 11/2010 | Chmielewski et al. |
| 2010/0306702 | A1 | 12/2010 | Warner |
| 2011/0066981 | A1 | 3/2011 | Chmielewski et al. |
| 2011/0209093 | A1 | 8/2011 | Hinckley et al. |
| 2011/0248928 | A1 | 10/2011 | Michaelraj |
| 2011/0273540 | A1* | 11/2011 | Lee ............. G06F 3/0346 348/51 |
| 2012/0036434 | A1 | 2/2012 | Oberstein |
| 2012/0042006 | A1 | 2/2012 | Kiley |
| 2012/0072867 | A1* | 3/2012 | Schlegel ............. G06F 3/0481 715/808 |
| 2012/0084663 | A1* | 4/2012 | Momchilov .......... G06F 3/0481 715/744 |
| 2012/0221976 | A1 | 8/2012 | Johns |

FOREIGN PATENT DOCUMENTS

| | | |
|---|---|---|
| CN | 101080070 A | 11/2007 |
| CN | 102077159 A | 5/2011 |
| CN | 102203711 A | 9/2011 |
| EP | 1840706 A1 | 10/2007 |
| JP | H0447358 A | 2/1992 |
| JP | H06242885 A | 9/1994 |
| JP | 2007510188 A | 4/2007 |
| JP | 2007511003 A | 4/2007 |
| JP | 2008509473 A | 3/2008 |
| JP | 2009037583 A | 2/2009 |
| JP | 2010530578 A | 9/2010 |
| JP | 2011107823 A | 6/2011 |

OTHER PUBLICATIONS

Heller, et al., "Chapter 16: Menus", In Book—Motif Programming Manuals for OSF/Motif Release 1.2, vol. 6A, Sep. 11, 1993, pp. 431-470.

"Supplementary European Search Report issued in Application No. 12812076.3", Mailed Date: Feb. 9, 2015, 10 Pages.

"International Search Report", Mailed Date: Jan. 31, 2013, Application No. PCT/US2012/046824, Filed date: Jul. 14, 2012, pp. 13.

"Context Menus and Sub-Menus", Retrieved at <<http://ignorethecode.net/blog/2009/03/21/context-menus-sub-menus/>>, Mar. 21, 2009, pp. 9.

Nguyen, Chuong, "Apple Patent Reveals GUI with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

Koenig, Joerg, "Radial Context Menu", Retrieved at <<http://www.codeproject.com/KB/system/RadialContextMenu.aspx>>, Jul. 21, 2005, pp. 4.

"Pie menu", Retrieved at <<http://web.archive.org/web/20110331143948/http://en.wikipedia.org/wiki/Pie_menu, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie in the Sky", Retrieved at >>http://web.archive.org/web/20100702160443/http://jonoscript.wordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf>>, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf>>, Retrieved Date: Dec. 28, 2012, pp. 9-18.

"Wacom Tablets. The basics.", Retrieved at <<http://images.autodesk.com/emea_s_main/files/Getting_Started.pdf>>, Feb. 25, 2011, pp. 11.

"ATOK for Android ", Retrieved at <<http://www.youtube.com/watch?v=bZiDbz0aJKk>>, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html>>, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html, Aug. 14, 2012, pp. 12.

"Pie in the Sky", Retrieved at <<http://jonoscript.wordpress.com/2008/10/28/pie-in-the-sky/>>, Oct. 28, 2008, pp. 41.

Grossman, et al., "Handle Flags: Efficient and Flexible Selections for Inking Applications", Retrieved at <<http://www.autodeskresearch.com/pdf/p167-grossman.pdf>>, Graphics Interface Conference, May 25-27, 2009, pp. 167-174.

"Context Based Menus", 61507983, Filed Date: Jul. 14, 2011, pp. 136.

"First Office Action and Search Report Issued in Chinese Patent Application No. 201280034632.9", Mailed Date: Dec. 29, 2015, 21 Pages.

"Office Action Issued in Japanese Patent Application No. 2014-520400", Mailed Date: May 31, 2016, 13 Pages.

"Second Office Action and Search Report Issued in Chinese Patent Application No. 201280034632.9", Mailed Date: Aug. 17, 2016, 24 Pages.

\* cited by examiner
† cited by third party

472 →

474

476

DYNAMIC CONTEXT BASED MENUS

CROSS REFERENCE TO RELATED APPLICATIONS

This application claims the benefit of U.S. Provisional Patent Application Ser. No. 61/507,983 filed on Jul. 14, 2011. The disclosures of the provisional patent application are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Menus for touch-enabled or gesture-enabled devices have special constraints and challenges. For example, such menus need to be touch and gesture enabled, and accessible with less precision than a mouse. The menus may not occupy extensive screen area and need to be flexible to changes in available screen area (e.g., landscape/portrait changes, different resolutions, appearance/disappearance of a virtual keyboard, etc.). The menus need to make use of features specific to touch devices (e.g., response to different gestures) and still work with a traditional mouse and keyboard. Users may tend to perform bursts of work on productivity applications on mobile devices—mainly read-only—not likely to be editing a long document for long hours on a mobile device. Thus, conventional menus are not geared to address this use model. They are also not comfortable and efficient in different contexts and/or positions (e.g., one finger/use of thumb/down on desk and typing). Furthermore, the command experience needs to be much richer for content creation and to provide a natural and delightful experience, which is expected with the more direct interaction that touch affords.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to context based menus that can be dynamically positioned, laid out, and activated. Presenting a plurality of executable commands and/or links to submenus, a context based menu may be displayed in various shapes and forms in relation to selected content displayed on a user interface and/or other factors such as available display space, user attributes, and similar ones. Submenus presenting commands within a category may be displayed in place of, adjacent to, or overlapping with a parent context based menu. Menu position, contents, and/or shape may be adjusted in response to changes in selected content, user contact location, changes in user interface, and the like.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
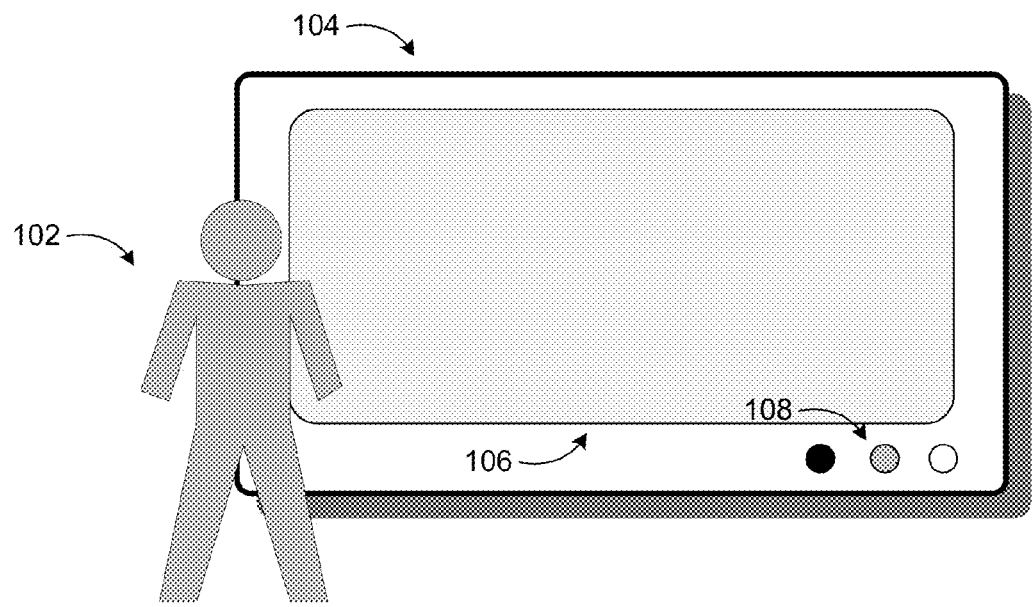
FIGS. 1A and 1B illustrate some example devices, where context based menus may be employed.
Figure 1A:
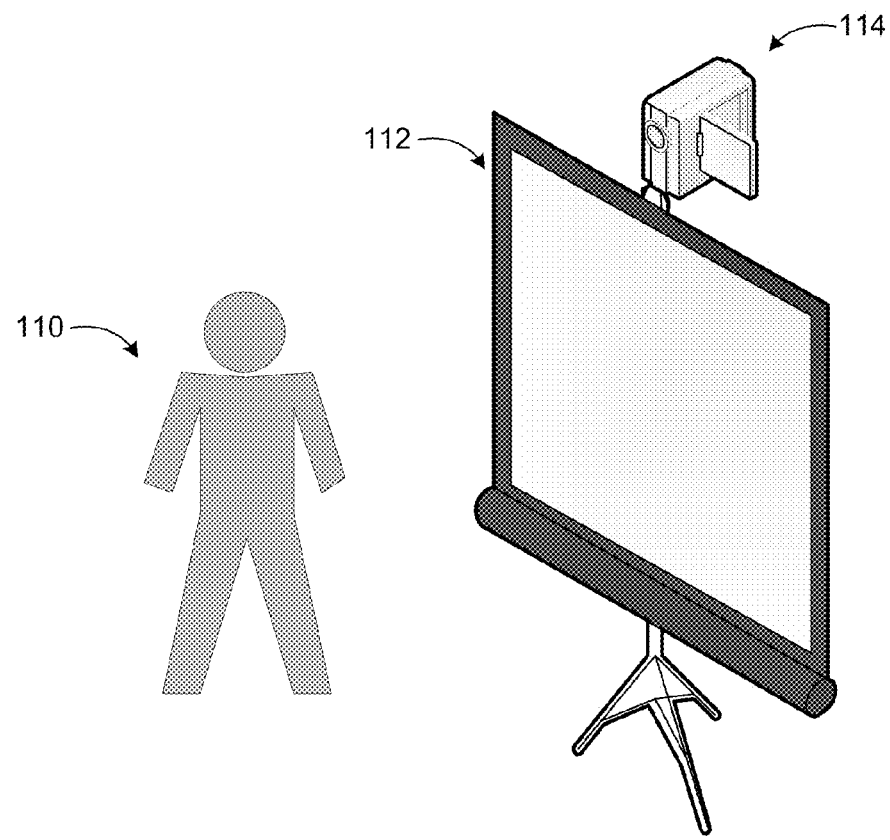

As briefly described above, dynamic context based menus present a plurality of executable commands and/or links to submenus in various shapes and forms in relation to selected content displayed on a user interface and/or other factors such as available display space, user attributes, and similar ones.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a user interface of a touch-enabled or gesture-enabled device may employ context based menus to manage displayed content. A context based menu may make use of features specific to touch or gesture enabled computing devices, but may also work with a traditional mouse and keyboard. Context based menus are used to provide quick access to commonly used commands while viewing or editing displayed content such as documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of commands for easy user access, but additional submenus may be presented upon user selection. Commonly used context based menus may appear over the viewed document. A tap or swipe action as used herein may be provided by a user through a finger, a pen, a mouse, or similar device, as well as through predefined keyboard entry combinations or a voice command.

Figure 1B:
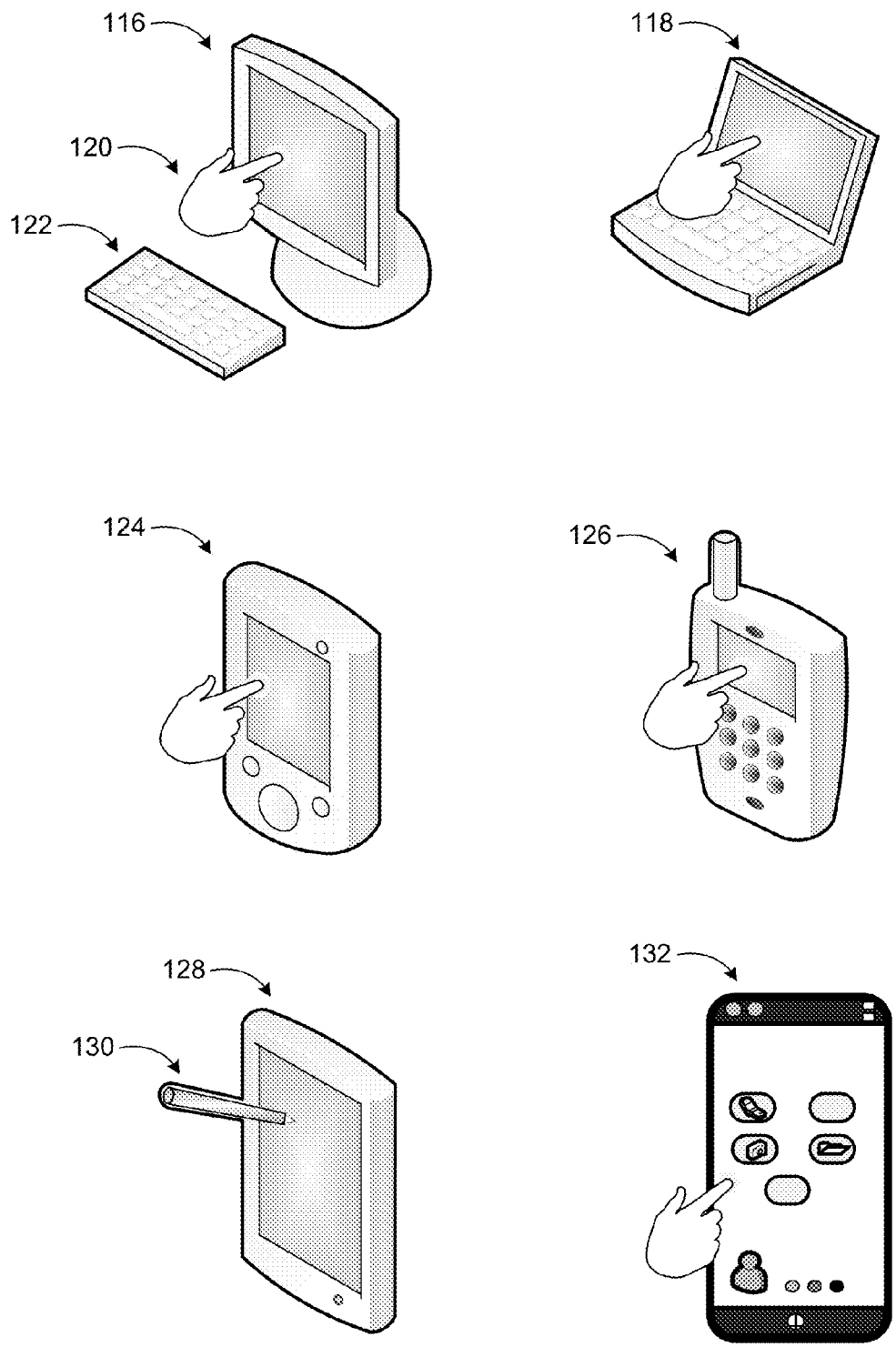

FIGS. 1A and 1B illustrate some example devices, where context based menus may be employed. As touch and gesture based technologies are proliferating and computing devices employing those technologies are becoming common, user interface arrangement becomes a challenge. Touch and/or gesture based devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Some embodiments are directed to dynamic, touch or gesture enabled, context based menus.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space and activated through a launcher mechanism that provides ease of use without usurping much needed display area.

Referring to FIGS. 1A and 1B, some example devices are illustrated, where a touch or gesture enabled, context based menu may be provided through activation by a launcher mechanisms according to embodiments. Embodiments may be implemented in other devices as well, with varying form factors and capabilities, as long as the devices are touch and/or gesture enabled.

Device 104 in FIG. 1A is an example of a large size display device, where a user interface may be provided on screen 106. Functionality of various applications may be controlled through hardware controls 108 and/or soft controls such as a touch or gesture enabled menu displayed on screen 106. A user may be enabled to interact with the user interface through touch actions or gestures (detected by a video capture device). The context based menu may be presented at a fixed location or at a dynamically adjustable location based on selected content, available display area, and similar factors. Examples of device 104 may include public information display units, large size computer monitors, and so on. While example embodiments are discussed in conjunction with small size displays, where available display area is valuable and location, size, content, etc. of a context based menu may be determined based on available display area; the opposite consideration may be taken into account in larger displays. For example, in a large size display such as a public information display unit or a large size computer monitor, a context based menu may be dynamically positioned near selected content such that the user does not have to reach over to the menu or have to move it in order to work comfortably.

Device 112 in FIG. 1A is an example for use of a gesture based menu to control functionality. A user interface may be displayed on a screen or projected on a surface and actions of user 110 may be detected as gestures through video capture device 114. The user's gestures may activate a touch or gesture enabled menu displayed on the device 112.

FIG. 1B includes several example devices such as touch enabled computer monitor 116, laptop computer 118, hand-held computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus. In addition, tools such as pen 130 may be used to provide touch input. A launcher indicator and a touch or gesture enabled, context based menu may be controlled also through conventional methods such as a mouse input or input through a keyboard 122.

Figure 2:
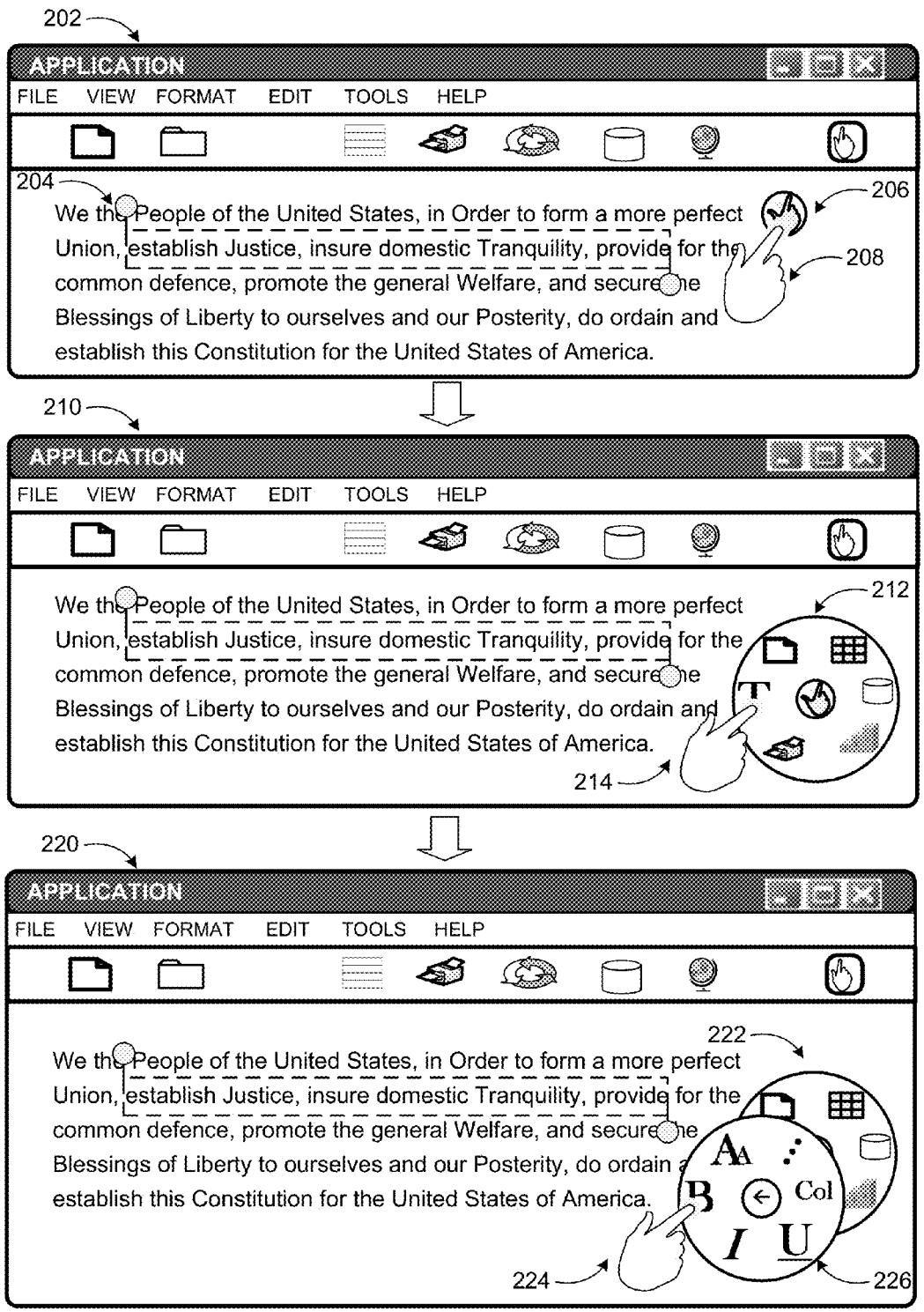
FIG. 2 illustrates launching and presentation of an example context based menu and an associated submenu according to embodiments.

FIG. 2 illustrates launching and presentation of an example context based menu and an associated submenu according to embodiments. A context based menu according to embodiments can appear close to a focus point (insertion point or selection), enable efficient invocation and/or use, allow commands to be scoped by context, provide increased scan ability (through radial shape), allow a fast learning curve for first time users, and enhance user experience. Such a menu may be implemented in any application that enables content to be viewed and/or edited such as a web browser, as well as in operating system user interfaces.

The example configurations of launcher indicator and context based menus in FIG. 2 are illustrated on example user interfaces, each of which includes textual menus, graphic command icons and textual and/or graphic content. A context based menu according to embodiments may be employed on any user interface with any type of content with or without other types of menus. Referring to user interface 202, a launcher indicator 206 may be used in vicinity of a selection 204 between selection handles on the user interface. If the user interface does not allow selection or display area is limited, a fixed location may be used for the indicator 206 and/or the underlying context based menu. Alternatively, the launcher may be hidden and a different gesture (e.g., tapping on the selection) may serve as activation for the underlying context based menu. Keyboard, mouse, touch, gesture, pen input, voice commands are some example input mechanisms that may be used in conjunction with the context based menu. Other example input mechanisms may include, but are not limited to, accelerometer or orientation sensor based input, optically captured gestures, time based input, proximity to other devices/people/places, and the like.

Upon activation (208) of the launcher indicator 206, top level context based menu 212 may be displayed, as shown on user interface 210, in relation to the selected content. The location of the context based menu may be selected at a fixed location on the user interface or a dynamically selected location based on the selected portion of the displayed content, a displayed content type, available display area, user interface borders, and/or a device type. If there is insufficient display area between the selected content and a user interface border to display the context based menu, the context based menu may be automatically moved to another location on the user interface, its size reduced, or the context based menu displayed partially. Furthermore, the context based menu 212 may be moved, its shape or size adjusted in response to a change in a size of the selected portion of the displayed content, a change in the size of the user interface, or a change in an orientation of the user interface.

While context based menu 212 is displayed in a radial shape, the menu may have a substantially radial, a substantially rectangular, a straight in-line, a curved in-line, a flower-like, or an irregular shape as discussed in more detail below. Upon selection of one of the items displayed on context based menu 212 via a tap action, a swipe action, or a press and hold action (214), submenu 226 on user interface 220 may be displayed. In the example illustration submenu 226 is shown overlapping with context based menu 222. In other configurations, the submenu may replace the context based menu or be displayed at a separate location concurrently.

The items on the context based menu 222 may represent different categories of commands or links with each associated submenu presenting commands in individual categories. Upon selection (224) of a command on submenu 226 via one of the actions discussed above, the command may be applied to the selected content. When the execution of the command is complete, the submenu may be hidden or remain in display.

Figure 3:
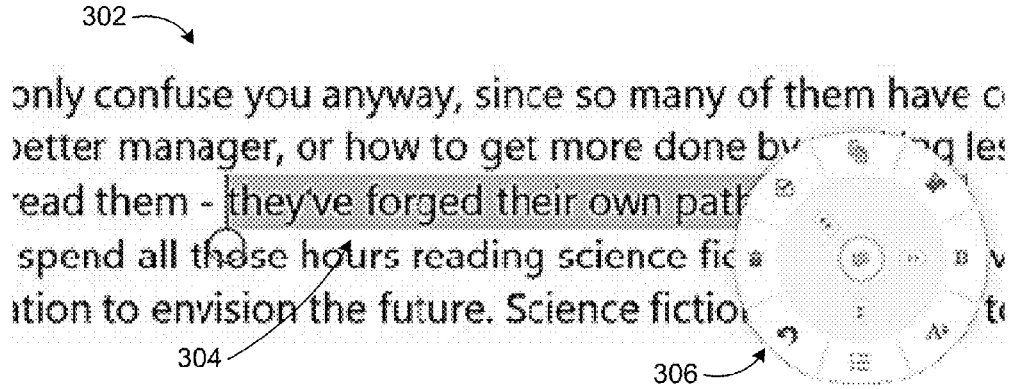
FIG. 3 illustrates placement of an example context based menu over displayed content and on the screen of a touch based device according to embodiments.
Figure 3:
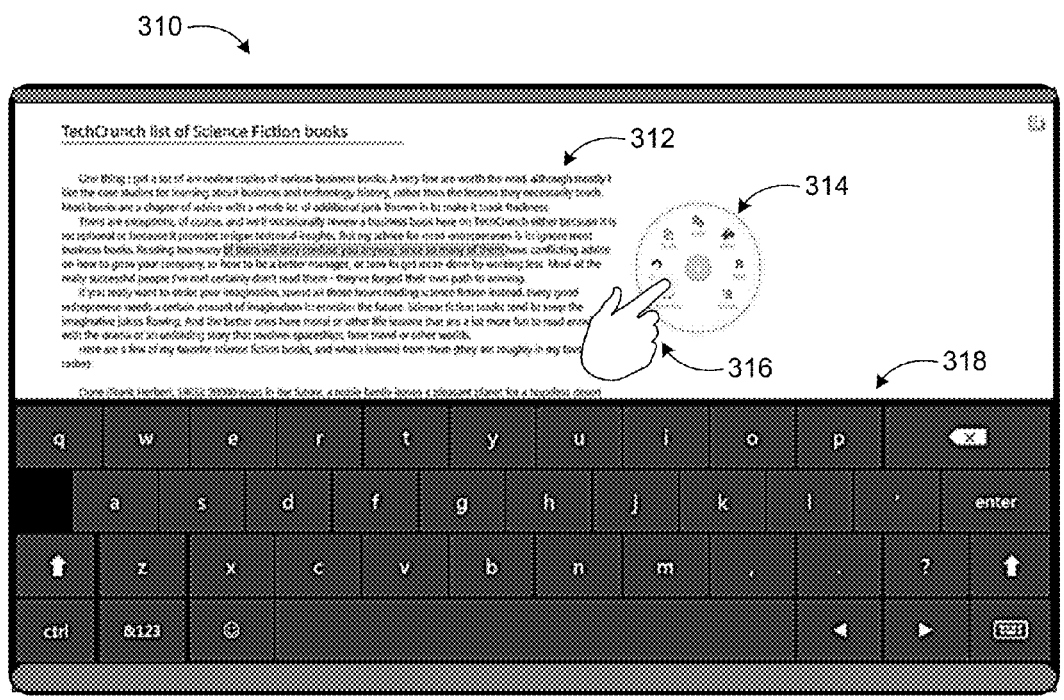

FIG. 3 illustrates placement of an example context based menu over displayed content and on the screen of a touch based device according to embodiments. Example view 302 includes textual content with a portion 304 selected. As discussed above, a context based menu according to embodiments may be displayed in relation to selected content, which may include in some cases displaying the menu over the selected content (e.g., if no free display space is available). Thus, context based menu 306 is shown over the selected portion 304. A system according to embodiments may perform following operations in positioning a context based menu. First, the menu may be tried to be positioned in the margin area immediately to the right of the text currently selected (or left in bidirectional languages like Arabic or Hebrew). If multiple lines are selected, the menu may be positioned vertically in the middle of the lines selected within the view (in other words, if some of the lines have been scrolled off the page, those may be excluded in calculating where to place the menu). If the first trial fails because the location is at the top or bottom of the screen (that is, the horizontal position is correct but the vertical position may be off-screen) then the menu may be shifted down or up respectively so that it just fits on the screen. If the first trial fails because the menu cannot be positioned horizontally there, it may be moved above the displayed content selection and tried to be positioned in the same horizontal position. If that still does not work, the system may try moving the menu below the selection and try to position it there but in the same horizontal position. If the last set of operations do not work, that probably means the selection covers the entire page. In that case, the menu may be positioned as close to the right (or left) side of the screen as possible, this time overlapping with the selection. If the place where the content is located changes (e.g., if the text width grows or an image grows), the menu may be positioned based on the rules again as discussed above.

In some embodiments, the context based menu may appear relative to the current selection allowing gestures or touch actions such as taps and/or swipes. In other examples, the context based menu may allow room for changes in content. For example, the context based menu may appear in tables at a fixed distance from the table so that the table can grow without occluding the indicator. The context based menu may also be moved if the sizes of an underlying object changes (e.g., if more text is added to a line of text, if the size of an image is increased or decreased, if columns or rows are added to a table, etc.). As previously discussed, in a large size display such as a public information display unit or a large size computer monitor, a context based menu may be dynamically positioned near selected content such that the user does not have to reach over to the menu or have to move it in order to work comfortably. Alternatively, a dynamically positioned context based menu may also enable multiple people work on the same display. For example, the context based menu may be tied to more than one selection at a time and a set of tools may be provided to a selection enabling more than one person to edit at a time.

Example user interface 310 illustrates how a context based menu 314 may be employed on a mobile or handheld touch/gesture capable device. In such devices, a virtual keyboard 318 may be displayed to allow editing content further reducing available display area. Context based menu 314 is displayed in empty space to the right of textual content 312 (other forms of content may also be used). The context based menu may also be presented and/or moved along a left side, a right side, a top, or a bottom of the selected portion of the displayed content based on a user attribute. The user attribute may include a left or right handedness of a user, a size of fingers, a size of tap action pointer associated with a pointing device, a user credential, an ergonomic characteristic of the device, and a location attribute comprising one or more of a language selection for the user interface, geographic location information, time zone information, and/or country information. If the size of the canvas changes (e.g., if the keyboard appears), then the context based menu may automatically move out of the way so as not to be covered by the keyboard.

According to further embodiments, a user gesture may be used to move the context based menu. For example, if the context based menu happens to be over content that the user needs to get to, then they could press and hold on the context based menu "dislodging it" and then drag and drop it elsewhere on the screen.

Figure 4A:
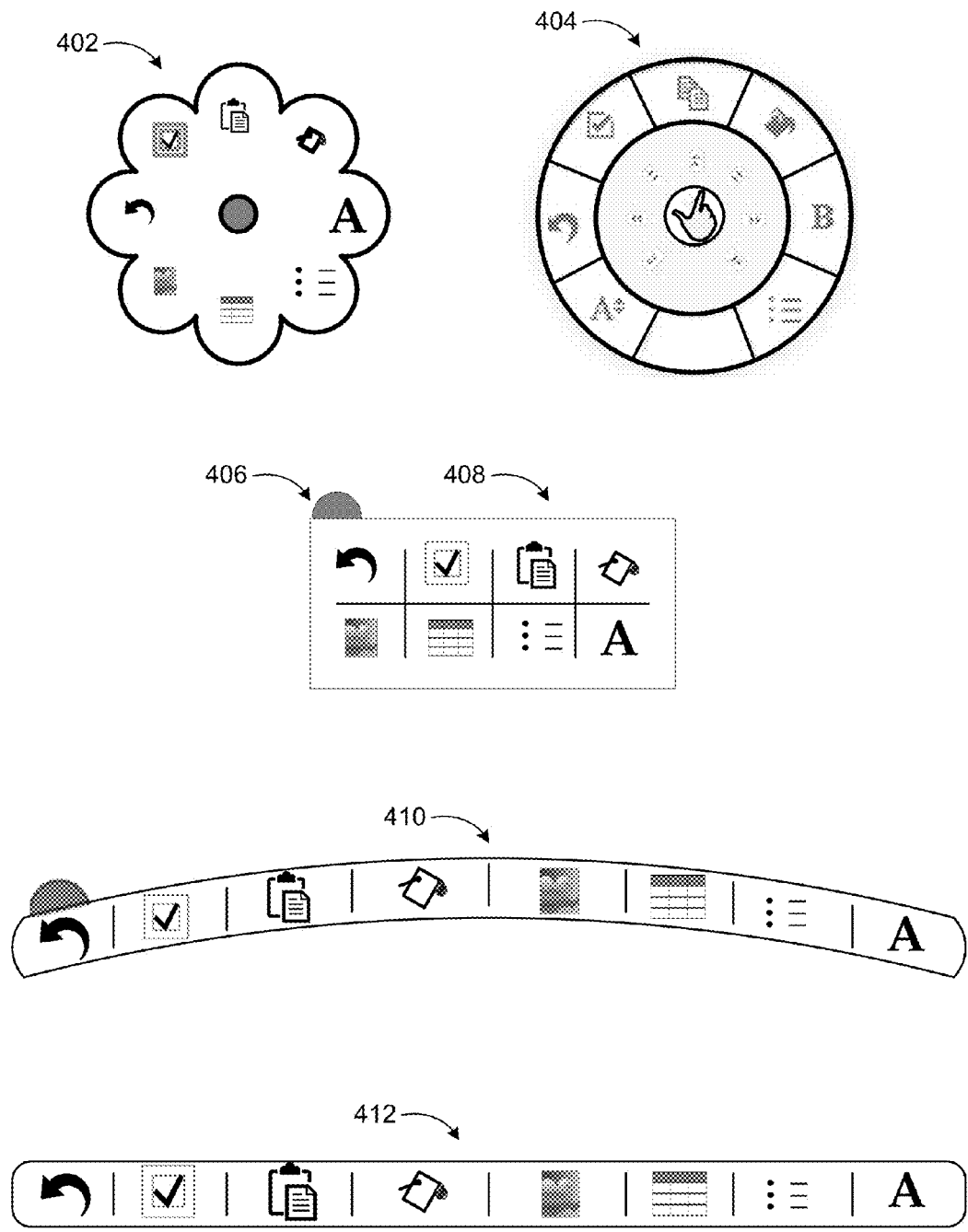
FIG. 4A through 4E illustrate some example context based menus of different shapes and example configurations for selecting available items through context based menus according to embodiments.

FIG. 4A illustrates some example context based menus of different shapes. A touch or gesture enabled context based menu may be activated by selecting a launcher indicator through tapping, pressing and holding, dragging/sliding or similar action.

Example context based menus include flower shaped menu 402, radial menu 404, rectangular menu 408, curved-in-line menu 410, and straight-in-line menu 412. Other shapes and configurations may also be employed. In the circularly shaped menus (402, 404), the items are displayed on segments of the menu with a back button at the center. The back button for collapsing the menu may also be located at other positions relative to the menu such as button 406 on rectangular menu 408.

In some embodiments, a layout of the items displayed on the context based menu may be arranged and rearranged automatically based on the user attribute or other factors. A number of schemes may be employed to enhance the effectiveness of the context based menu such as a color scheme, a graphical scheme, a shading scheme, and comparable ones. For example, the items may be displayed in dark and/or light formats, which may be used interchangeably depending on a background color. In some embodiments, the light or dark formats may be used to emphasize executed commands.

Figure 4B:
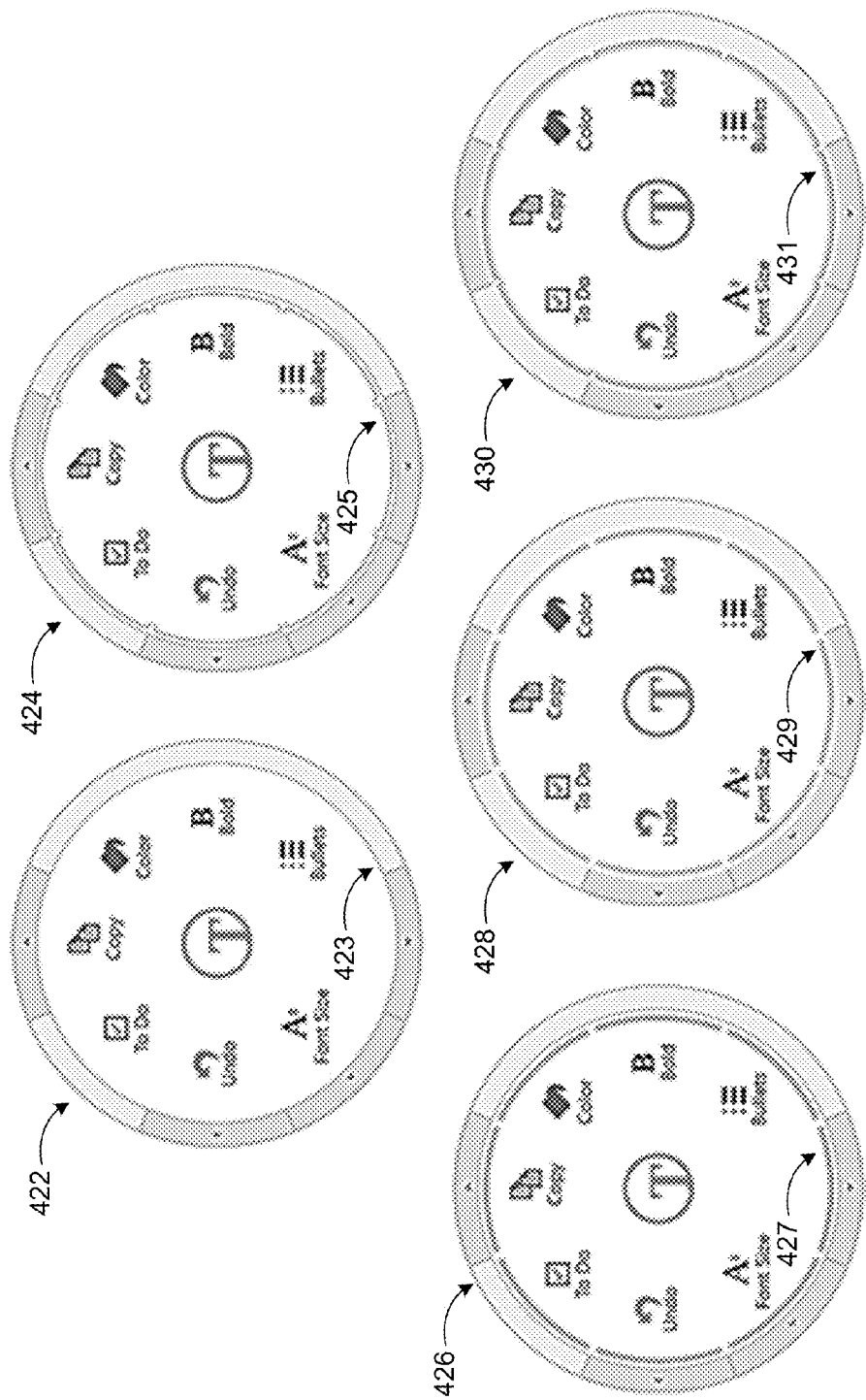

FIG. 4B illustrates five example states and their visualization for a radially shaped context based menu. The example states include "rest" state 422, "hover" state 424, "pressed" state 426, "selected" state 428, and "hover selected" state 430. The visualization of the menu may be varied by using different coloring or shading schemes, as well as different graphical schemes associated with the inside circles 423, 425, 427, 429, and 431, respectively, as shown in FIG. 4B. Other visualization schemes may also be employed.

Figure 4C:
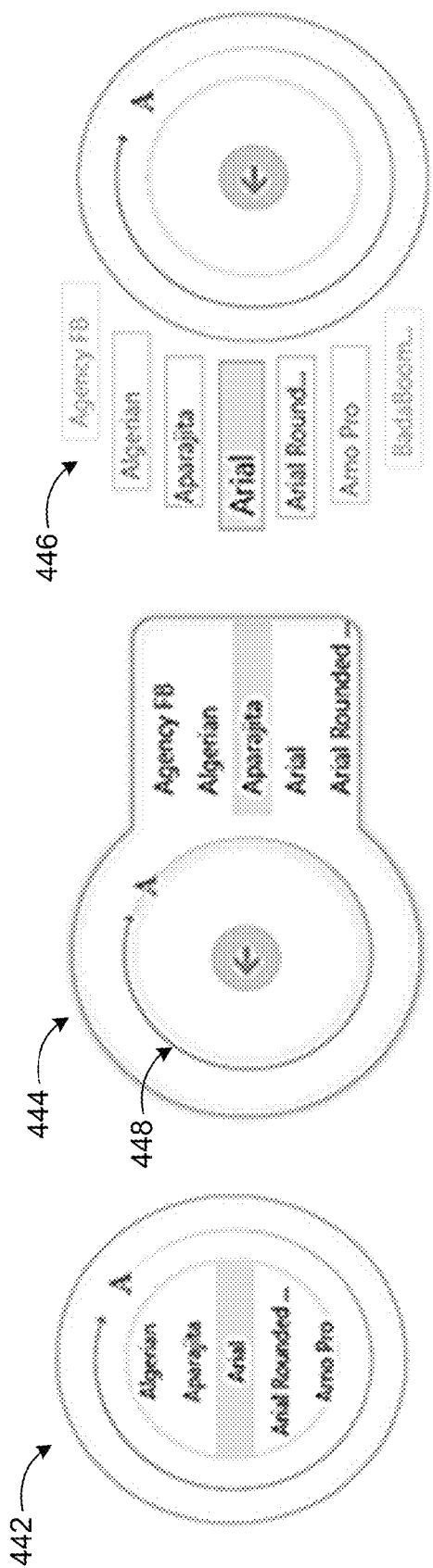
Figure 4D:
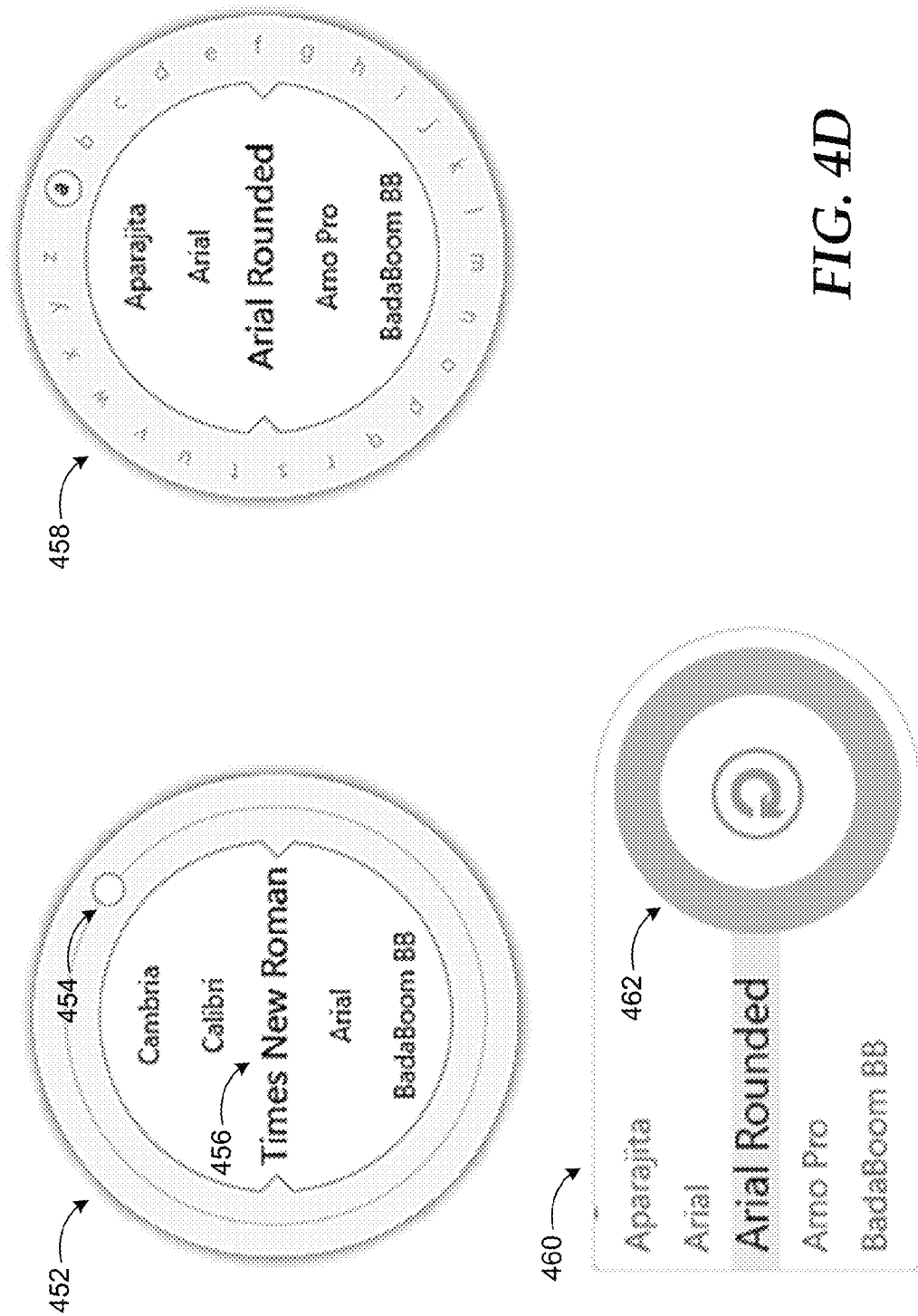

FIGS. 4C and 4D illustrate different example configurations of a context based menu for selecting font styles. In FIG. 4C, radially shaped context based menu 442 enables a user to swipe radially on the menu while available options are displayed in a scrolling manner at the center of the menu. A similar radial swipe action 448 on context based menu 444 results in available options being scrolled through on an extension box with a current selection being highlighted. A similar scheme is employed in context based menu 446, where the available options are displayed in a scrolling fashion along one side (left or right) of the menu with the current selection emphasized through a color scheme, shading scheme, and/or highlighting scheme.

In FIG. 4D, context based menu 452 enables a user to rotate an icon 454 along the perimeter of the radially shaped menu for selecting among font styles. A currently selected font style 456 is displayed at the center of the radially shaped menu, while others are scrolled as the icon 454 is rotated along the perimeter. Radially shaped context based menu 458 is another variation of the selection approach where letters displayed along the perimeter of the menu are assigned to available font styles. In other embodiments, numbers or graphic icons may also be assigned to different items available for selection through the menu. Finally, context based menu 462 enables selection of available items (e.g., font styles) through a rotating swipe action while available fonts (and the current selection) are displayed on one side of the radially shaped menu in a list form.

Figure 4E:
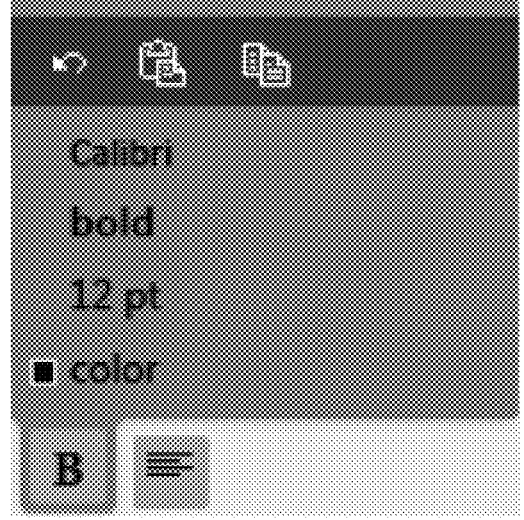
Figure 4E:
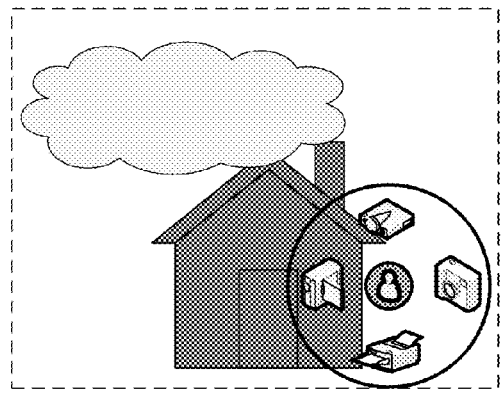

FIG. 4E illustrates three different context based menu styles and configurations. Example configuration 472 displays organization of a traditional context based menu into categories where the categories alter the top of the menu. Thus, the look and feel of the menu is similar to conventional menu designs, but the hierarchy is based on the radially shaped context based menu examples discussed above. Configuration 474 is an example of a transparent, radially shaped context based menu overlapping with an image, where the number of items at the top level menu is reduced to accommodate space limitations. Configuration 476 illustrates an example visual style of a context based menu that connects it much more tightly to the textual content associated with the menu. The above-discussed configurations are exemplary for illustration purposes only. Other menu shapes, styles, and configurations with any number of elements and presentation schemes may be employed using the principles described herein.

Of course, other icons, symbols, textual content, etc. may be used to represent specific context based menus and sub-menus. According to some embodiments, a context based touch or gesture enabled menu may be activated without a launcher indicator being displayed. For example, the menu may be presented directly in response to selection of a portion of the displayed content. The menu may also be presented just based on a gesture. For example, press and hold anywhere on the screen or pressing the context menu key on the keyboard may display the context based menu.

Figure 5:
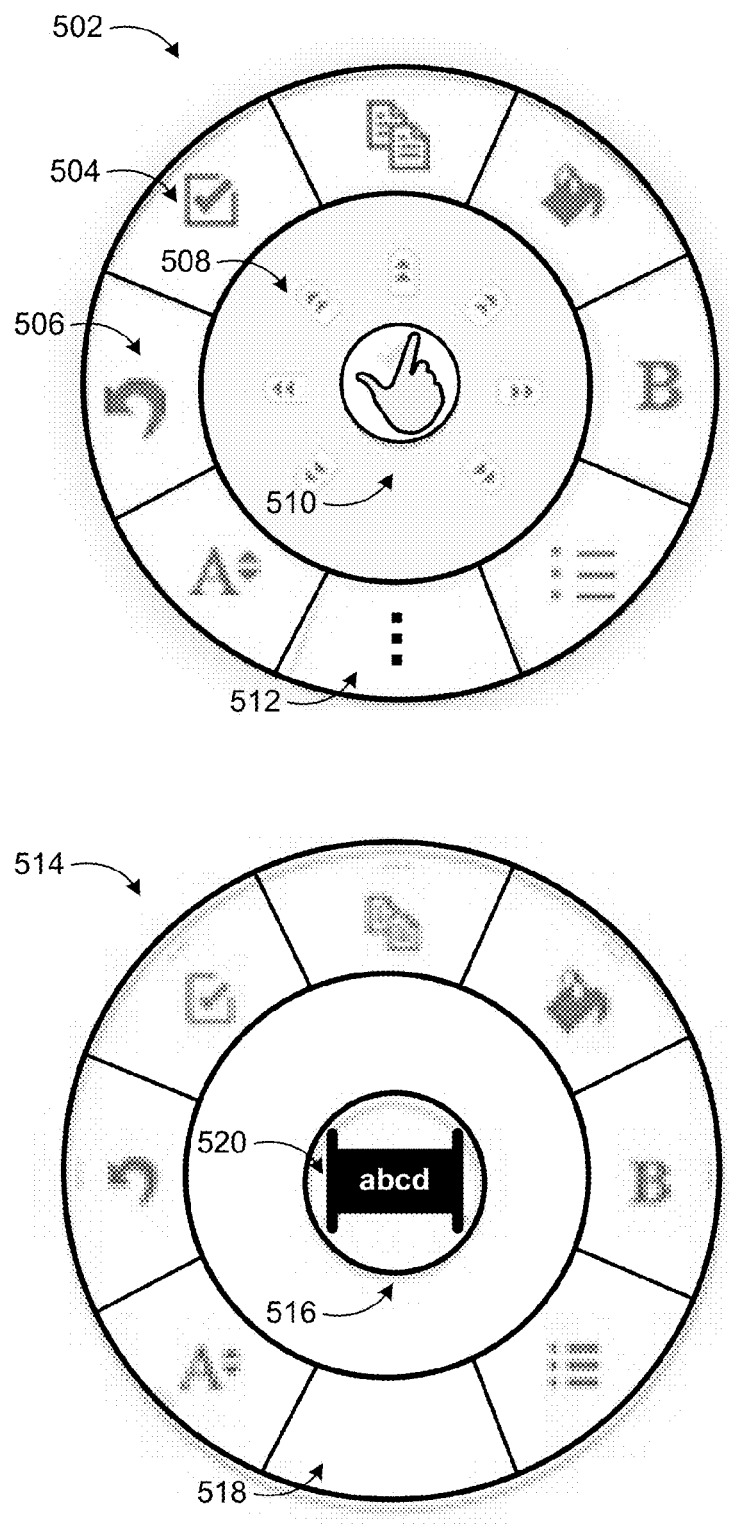
FIG. 5 illustrates different aspects of an example context based menu according to some embodiments.

FIG. 5 illustrates different aspects of an example context based menu according to some embodiments. In the example configuration of context based menu 502, the menu is circularly shaped with the items positioned in segments radially on the menu. The items (e.g., 504, 506) may include executable commands or links to submenus. In cases, where there are more items than can be fitted onto the menu, one of the items such as the ellipsis item 512 may be used to open another menu with further commands or links. Some of the items may be associated with one or more submenus presenting commands in a particular category. These links may be indicated graphically such as the double arrows 508 near the center of the menu. The launcher indicator 510 at the center of the menu may also be used to collapse the menu.

In some embodiments, a selected item or a category of displayed items of the context based menu may be displayed at the center of the context based menu. In other embodiments, a type of selected portion of the content to which the items on the context based menu apply may be displayed at the center.

Context based menu 514 illustrates yet another configuration, where a center 520 of the context based menu indicates that the content on the page is text selection and thus that is the kind menu that appeared for selecting among available options such as different text styles, sizes, etc. In yet other embodiments, items on the context based menu may represent a current state including one or more of a mouse hover, a keyboard focus, an item pressed, an item selected, a hover selected, an item disabled, a disabled hover, and a normal state.

The context based menus 502 and 514 may employ a hub & spoke interaction at the top level, while dial and/or hub & spoke interactions may be enabled at sub-menu levels. Touch based interactions may include a slide to a menu item or to a submenu launcher, a slide around the perimeter, or a tap on a menu item. Live preview of a selected or considered menu item may be provided. Also, textual identifiers for various menu items may be provided at the bottom/top/center or vicinity of each menu item.

Figure 6:
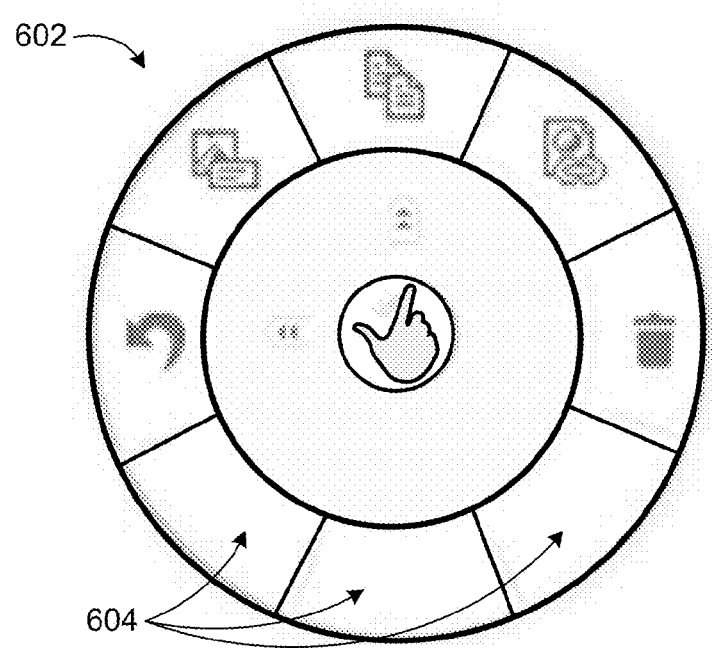
FIG. 6 illustrates use of empty segments and indication of multiple item selection in an example context based menu according to some embodiments.
Figure 6:
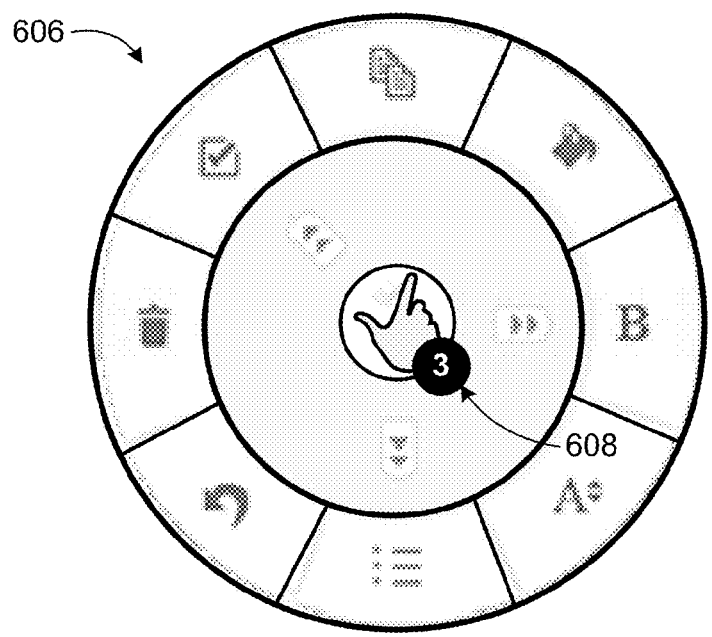

FIG. 6 illustrates use of empty segments and indication of multiple item selection in an example context based menu according to some embodiments. While the different segments of the radially shaped context based menu shown in this figure and others are shown with lines between the segments that is for emphasized illustration purposes only. A menu according to embodiments may or may not include lines or other separators between the segments corresponding to different items on the menu. Example context based menu 602 includes five items and three empty segments 604. In some embodiments, empty segments 604 may be grouped in a layout of the context based menu and rendered in a transparent manner to allow more display area. For example, a submenu may be displayed overlapping with the empty segments of the context based menu, thereby avoiding covering of active items on the context based menu.

In other embodiments, selection of more than one item on the display surface may be enabled. The multiple item selection may be indicated on the menu launcher so that a user can know before opening the menu how many items are selected, as well as on the menu such as the numeric indicator 608 at the center of context based menu 606. A selected item on the context based menu may then be applied to the multiple selected portions of the displayed content.

Figure 7:
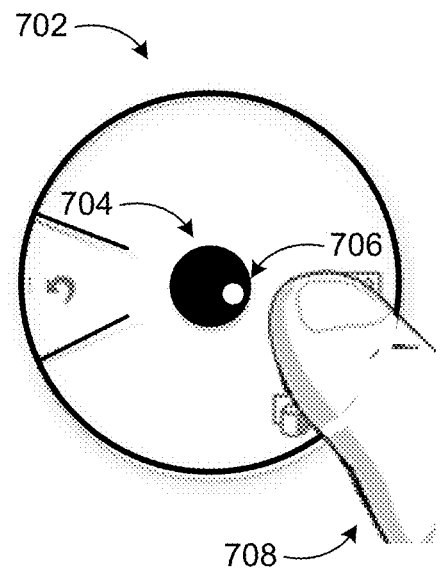
FIG. 7 illustrates use of animated indication and display of keyboard assistance in an example context based menu according to other embodiments.
Figure 7:
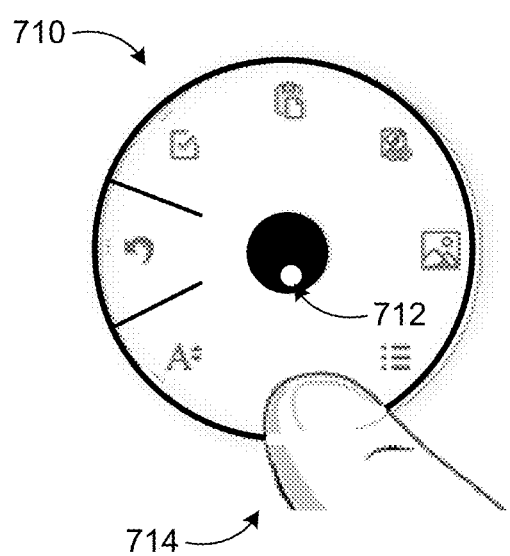

FIG. 7 illustrates use of animated indication in an example context based menu. According to some embodiments, each item displayed on the context based menu may include a graphic object, a textual object, or a combination of graphic and text object. Moreover, a color scheme, a graphical scheme, an animation scheme, and/or a shading scheme may be employed to enhance a visual effect of the context based menu.

The example context based menu 702 includes an animated center 704, where an indicator 706 moves to indicate a selected item on the context based menu upon detecting a selection action 708 such as a tap or a swipe. Context based menu 710 illustrates how the indicator 712 has changed position to indicate a different item upon detecting another selection action 714. A number of animation schemes may be employed in conjunction with context based menus. Any icons or text representing items on the parent or submenus may be displayed in an animated fashion, choices for selected items such as different font styles, colors, formats, etc. may be presented in an animated fashion (e.g., scrolling, flying in, appearing/disappearing, etc.), and the menu may react to user actions such as hovering or selection in an animated fashion. For example, the launcher may be animated (e.g., for a pen menu, the launcher may show a pen moving). Similarly, the context based menu may display an animated finger or pen in response detected user actions (e.g., swipe, tap, etc.). Further animations may include in appearance of parent menu or submenus in response to an activation action by the user. For example, the curved-in-line menu in FIG. 4 may appear as an unfolding arc. In some examples, a submenu may be grown in an animated fashion from the center or another location of the parent menu overlapping with or replacing the parent menu. Other animation schemes may be employed in conjunction with one or more other schemes as discussed below.

In addition to enabling touch and/or gesture based actions, a context based menu according to embodiments may also react to keyboard entries, mouse clicks, and/or pen inputs. To assist a user in using input devices for other than touch or gesture based input, tips may be displayed in relation to each item (and center) of a context based menu such as alphanumeric tips on the context based menu indicating keys on a keyboard associated with each item on the menu.

Figure 8:
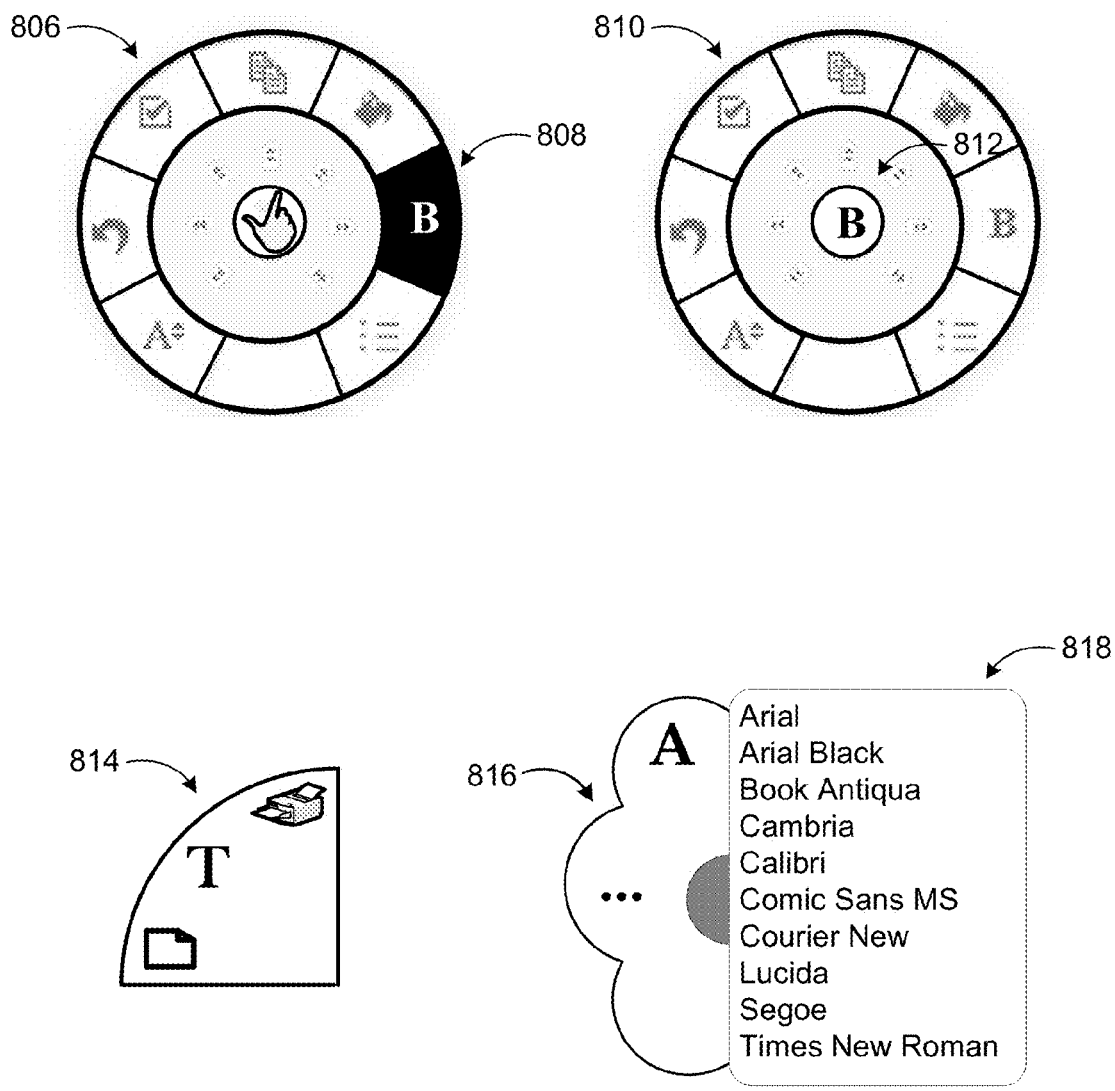
FIG. 8 illustrates further aspects of an example context based menu according to some embodiments.

FIG. 8 illustrates further aspects of an example context based menu. In some embodiments, a textual tip associated with one or more displayed items may be displayed inside the context based menu or outside the context based menu such as a tip associated with a menu item.

In addition to the above-discussed schemes for enhancing visual effects of a context based menu, items on the menu may be presented in a manner to enhance a user's understanding of which command was last executed. This may be accomplished by highlighting, changing color, or background of a selected item such as item 808 on context based menu 806. In other embodiments, the selected item or last executed command may be displayed at the center of the menu as a reminder such as center 812 of context based menu 810.

In further embodiments, a context based menu may be displayed partially if there is limited available space or empty segments on the menu. In case of a fully loaded menu but limited space, the partially displayed menu 814 may be rotatable. Thus, a user may rotate the menu by swiping on it or tapping a particular element on the menu and be presented with additional elements.

In yet other embodiments, a list of commands in each category may be displayed in a vicinity of a representative command upon detecting a hover-on action or a selection of the representative command. For example, upon selection of font style element in context based menu 816, the list of available font styles may be presented overlapping with the context based menu in a list-style menu 818. Of course, the related commands may be presented using any form or shape in addition to the list style.

Figure 9:
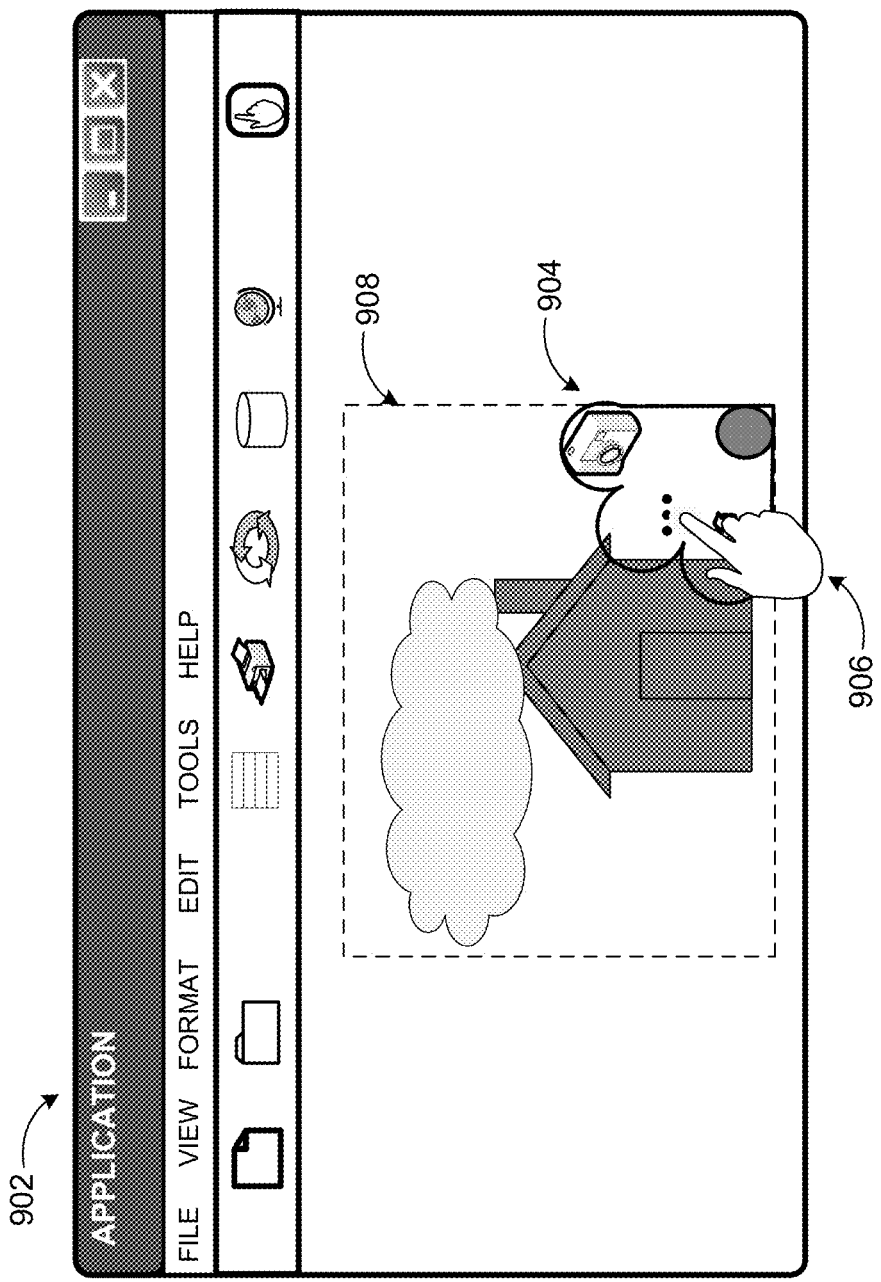
FIG. 9 illustrates an example partial context based menu according to some embodiments.

FIG. 9 illustrates an example partial context based menu according to some embodiments. To accommodate limited display space, especially in mobile devices, a context based menu may be displayed partially and in connection with a selected portion of content enabling a user to associate the menu with the selected content while preserving valuable display space.

User interface 902 shows an example context based menu 904 anchored to a corner of selected content 908 (image). The items in the menu may be selected based on the content type such that highest priority (or highest usage) items are displayed first. Other items may be displayed upon selection of an item (906) such as an ellipsis item indicating further elements or by rotating the context based menu. The menu may be positioned in different locations adjacent to the selected content 908 based on user attributes (e.g., on the left side, right side, top, bottom, etc.).

The example context based menus, items, interactions, and configurations depicted in FIGS. 1 through 9 are provided for illustration purposes only. Embodiments are not limited to the shapes, forms, and content shown in the example diagrams, and may be implemented using other textual, graphical, and similar schemes employing the principles described herein.

Figure 10:
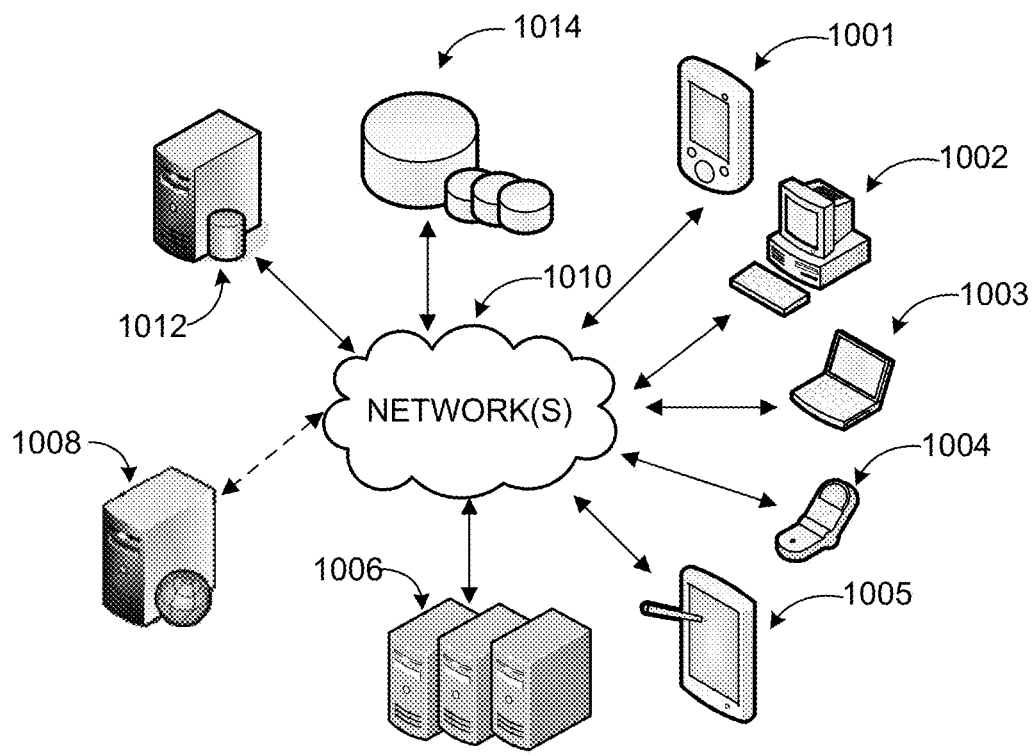
FIG. 10 is a networked environment, where a system according to embodiments may be implemented.

FIG. 10 is an example networked environment, where embodiments may be implemented. In addition to locally installed applications, such as application 822 discussed below, context based menus may also be employed in conjunction with hosted applications and services that may be implemented via software executed over one or more servers 1006 or individual server 1008. A hosted service or application may be a web-based service or application, a cloud based service or application, and similar ones, and communicate with client applications on individual computing devices such as a handheld computer 1001, a desktop computer 1002, a laptop computer 1003, a smart phone 1004, a tablet computer (or slate), 1005 (client devices') through network(s) 1010 and control a user interface presented to users. One example of a web-based service may be a productivity suite that provides word processing, spreadsheet, communication, scheduling, presentation, and similar applications to clients through a browser interface on client devices. Such a service may enable users to interact with displayed content through context based menus and a variety of input mechanisms as discussed herein.

As discussed, a context based menu may be used for controlling functionality provided by the hosted service or application. The context based menu may be activated through a fixed or dynamic location launcher indicator.

Client devices 1001-1005 are used to access the functionality provided by the hosted service or application. One or more of the servers 1006 or server 1008 may be used to provide a variety of services as discussed above. Relevant data may be stored in one or more data stores (e.g. data store 1014), which may be managed by any one of the servers 1006 or by database server 1012.

Network(s) 1010 may comprise any topology of servers, clients, Internet service providers, and communication media. A system according to embodiments may have a static or dynamic topology. Network(s) 1010 may include a secure network such as an enterprise network, an unsecure network such as a wireless open network, or the Internet. Network(s) 1010 may also coordinate communication over other networks such as PSTN or cellular networks. Network(s) 1010 provides communication between the nodes described herein. By way of example, and not limitation, network(s) 1010 may include wireless media such as acoustic, RF, infrared and other wireless media.

Many other configurations of computing devices, applications, data sources, and data distribution systems may be employed to provide context based menus. Furthermore, the networked environments discussed in FIG. 10 are for illustration purposes only. Embodiments are not limited to the example applications, modules, or processes.

Figure 11:
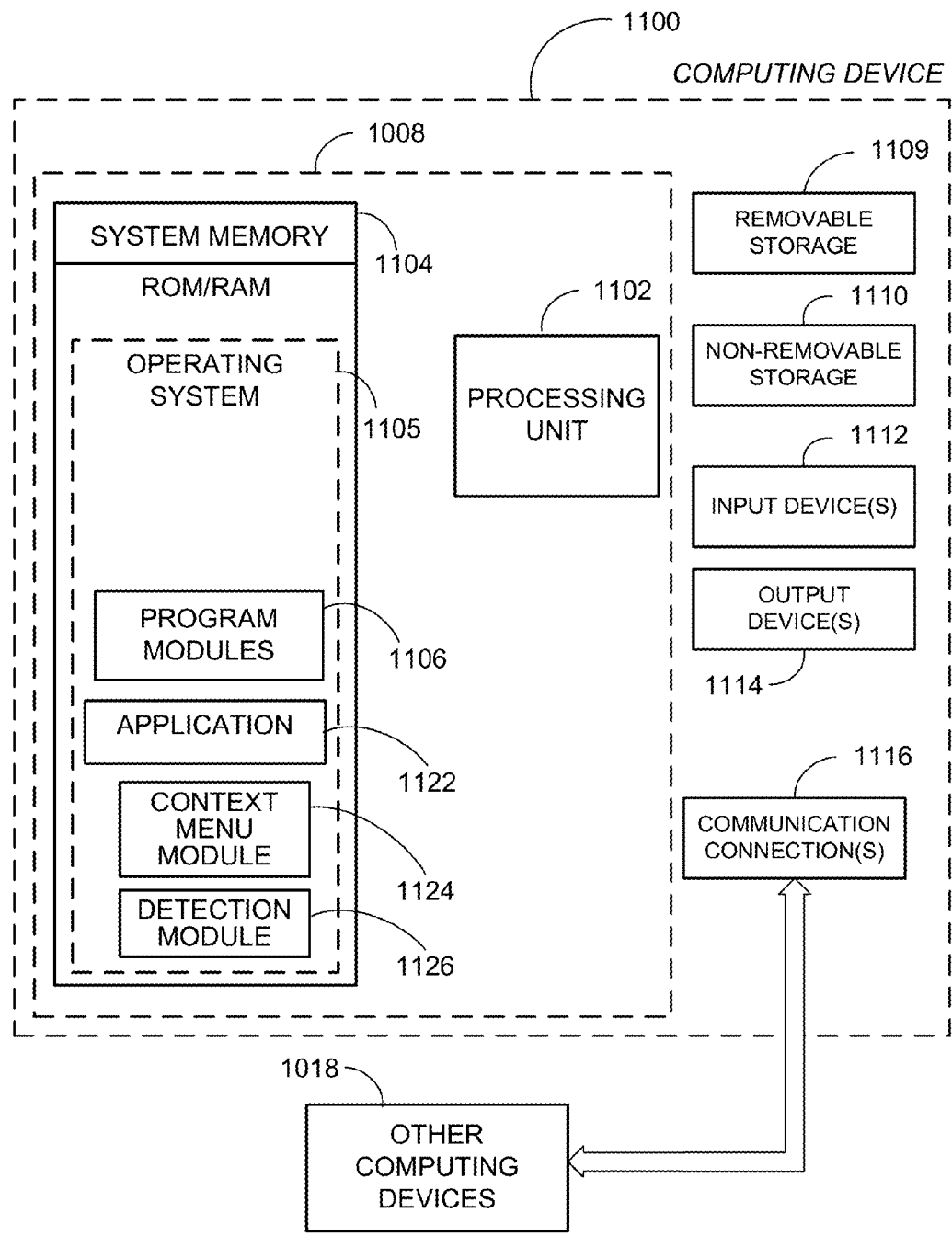
FIG. 11 is a block diagram of an example computing operating environment, where embodiments may be implemented.

FIG. 11 and the associated discussion are intended to provide a brief, general description of a suitable computing environment in which embodiments may be implemented. With reference to FIG. 11, a block diagram of an example computing operating environment for an application according to embodiments is illustrated, such as computing device 1100. In a basic configuration, computing device 1100 may be any touch and/or gesture enabled device in stationary, mobile, or other form such as the example devices discussed in conjunction with FIGS. 1A, 1B, and 10, and include at least one processing unit 1102 and system memory 1104. Computing device 1100 may also include a plurality of processing units that cooperate in executing programs. Depending on the exact configuration and type of computing device, the system memory 1104 may be volatile (such as RAM), non-volatile (such as ROM, flash memory, etc.) or some combination of the two. System memory 1104 typically includes an operating system 1105 suitable for controlling the operation of the platform, such as the WINDOWS®, WINDOWS MOBILE®, or WINDOWS PHONE® operating systems from MICROSOFT CORPORATION of Redmond, Wash. The system memory 1104 may also include one or more software applications such as program modules 1106, application 1122, context based menu module 1124, and detection module 1126.

Context based menu module 1124 may operate in conjunction with the operating system 1105 or application 1122 and provide a touch and/or gesture enabled, context based menu as discussed previously. Detection module 1126 may detect selection of various context based menu items. This basic configuration is illustrated in FIG. 11 by those components within dashed line 1108.

Computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer readable storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer readable storage media may be part of computing device 1100. Computing device 1100 may also have input device(s) 1112 such as keyboard, mouse, pen, voice input device, touch input device, an optical capture device for detecting gestures, and comparable input devices. Output device(s) 1114 such as a display, speakers, printer, and other types of output devices may also be included. These devices are well known in the art and need not be discussed at length here.

Computing device 1100 may also contain communication connections 1116 that allow the device to communicate with other devices 1118, such as over a wireless network in a distributed computing environment, a satellite link, a cellular link, and comparable mechanisms. Other devices 1118 may include computer device(s) that execute communication applications, other directory or policy servers, and comparable devices. Communication connection(s) 1116 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 12:
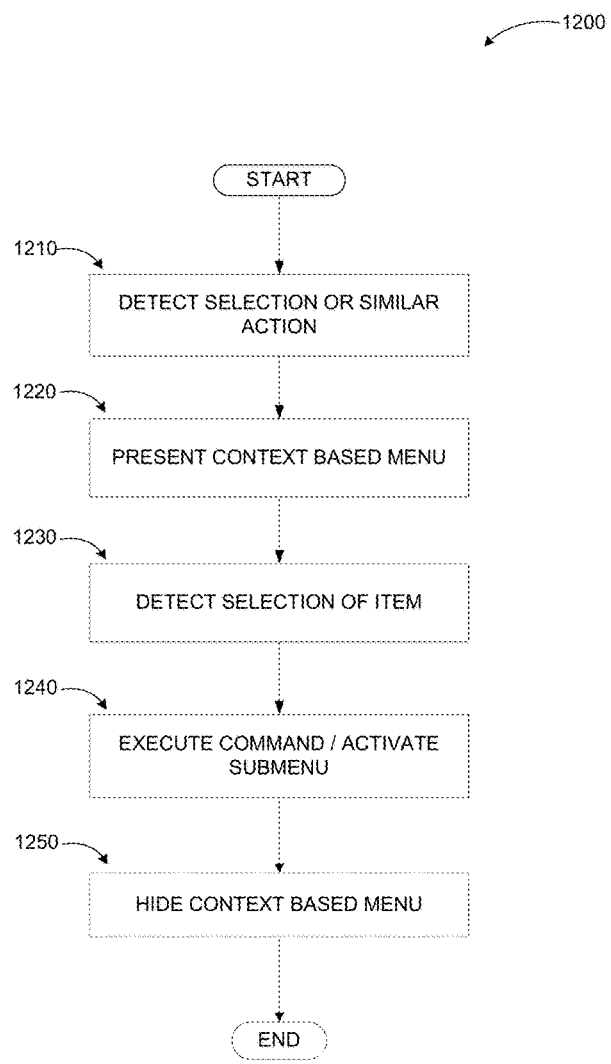
FIG. 12 illustrates a logic flow diagram for a process of employing a dynamic context based menu according to embodiments.

FIG. 12 illustrates a logic flow diagram for a process of employing dynamic context based menus according to embodiments. Process 1200 may be implemented as part of an application or an operating system.

Process 1200 begins with operation 1210, where a selection of content, activation of a launcher indicator, or similar action (e.g., tapping or equivalent gesture on the screen) may be detected. Upon detection of a portion of the content or similar action, a dynamic context based menu may be presented at operation 1220. The location of the dynamic context based menu may be selected automatically based on selected content, location of user action, available display area, user attributes (e.g., if the language is a right-to-left written language), and similar factors.

Following the presentation of the context based menu, selection of an item on the menu may be detected at operation 1230 through a tap, swipe, press-and-hold, or similar action. The items on the menu may be executable commands or links to submenus. At operation 1240, a selected command may be executed or a submenu displayed depending on the selected item. Upon execution of particular commands or based on a configuration of the context based menu, the menu may be hidden at optional operation 1250. If a submenu is launched, the context based menu may also be hidden, continue to be displayed entirely or partially. The appearance and/or disappearance of the context based menu may be animated. In some embodiments, individual elements on the context based menu and/or transitions may be animated as well.

The operations included in process 1200 are for illustration purposes. Presenting context based menus according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing a dynamic context based menu, the method comprising:
   in response to detecting one of: a selection of a portion of displayed content on a user interface, a tap action on an insertion point gripper, and an action associated with a launcher indicator on the user interface, presenting the context based menu at a dynamically selected location based on at least one from a set of: the selected portion of the displayed content, a displayed content type, available display area, user interface borders, a type of input, and a device type, wherein presenting the context based menu comprises:
      in response to detecting one of: a limited available space on the user interface and empty segments on the context based menu, displaying a partial view of the context based menu; and
      in response to detecting both of: the limited available space on the user interface and full segments on the context based menu, rotating the partial view of context based menu;
   in response to detecting selection of one or more items from a plurality of items displayed on the context based menu, one of:
      executing a command and
      displaying a submenu associated with the selected one or more items by automatically arranging a layout of the items displayed on the context based menu based on a user attribute, wherein the user attribute includes at least one from a set of: a left or right handedness of a user, a size of fingers, and a size of tap action pointer associated with a pointing device; and
   displaying a textual tip associated with the selected one or more items, wherein the textual tip is positioned on one of an interior and an exterior of the context based menu.

2. The method of claim 1, wherein the action associated with the launcher indicator on the user interface includes at least one from a set of: a tap action on a fixed launcher indicator on the user interface, a tap action on a dynamic launcher indicator, a swipe action on the dynamic launcher indicator, a keyboard entry combination, a mouse input, a pen input, a tap action on a selected object, a tap action on one of a pair of content selection handles, an accelerometer sensor based input, an orientation sensor based input, an optically captured gesture, a time based input, a proximity to another device, a proximity to another person, and a proximity to a place.

3. The method of claim 1, further comprising:
   presenting the context based menu at a fixed location on the user interface.

4. The method of claim 1, further comprising:
   presenting the context based menu along one of: a left side, a right side, a top, and a bottom of the selected portion of the displayed content based on the user attribute.

5. The method of claim 1, wherein the user attribute further includes at least one from a set of: a user credential, an ergonomic characteristic of the device, and a location attribute comprising one or more of a language selection for the user interface, geographic location information, time zone information, and country information; and
   automatically moving the context based menu in response to a change of the user attribute.

6. The method of claim 1, further comprising:
   in response to a change of the available display area, moving the context based menu to a different location on the user interface.

7. The method of claim 6, wherein the change of the available display area is appearance of a virtual keyboard.

8. The method of claim 1, wherein the context based menu includes one of: a substantially radially menu presenting items representing distinct categories of commands and a list style menu, where categories of displayed items alter presentation of items on the context based menu, and wherein at least one of a number of items displayed on the context based menu and a menu style is adjusted based on available display area and the displayed content type such that the context based menu is connected with the selected portion of the displayed content.

9. The method of claim 8, wherein the context based menu has one of a substantially radial, a substantially rectangular, a straight in-line, a curved in-line, a flower-like, and an irregular shape.

10. The method of claim 1, further comprising:
displaying one or more segments of the context based menu in a transparent manner such that one of: underlying displayed content is visible and overlapping of the context based menu and the submenu is accommodated.

11. The method of claim 1, further comprising:
at least one from a set of: moving the context based menu, modifying a shape of the context based menu, and modifying a size of the context based menu in response to one of: a change in a size of the selected portion of the displayed content, a change in the size of the user interface, a change in a type of the selected portion of the displayed content, and a change in an orientation of the user interface.

12. The method of claim 1, further comprising:
enabling selection of available items in a category through a rotating swipe action on a substantially radial shaped context based menu, wherein the available items are displayed in a scrolling list fashion in one of: a center and a vicinity of the context based menu.

13. A computing device for providing a dynamic context based menu, the computing device comprising:
an input device;
a memory;
a processor coupled to the memory and the input device, the processor executing an application and causing a user interface associated with the application to be displayed on a screen, wherein the processor is configured to:
in response to detecting one of: a selection of a portion of displayed content on a user interface, a tap action on an insertion point gripper, and an action associated with a launcher indicator on the user interface, present the context based menu at a dynamically selected location based on at least one from a set of: the selected portion of the displayed content, a displayed content type, available display area, user interface borders, a type of input, and a device type, wherein the context based menu is presented by:
in response to detecting one of: a limited available space on the user interface and empty segments on the context based menu, displaying a partial view of the context based menu; and
in response to detecting both of: the limited available space on the user interface and full segments on the context based menu, rotating the partial view of context based menu;
in response to detecting selection of one or more items from a plurality of items displayed on the context based menu, one of:
execute a command and
display a submenu associated with the selected one or more items by automatically arranging a layout of the items displayed on the context based menu based on a user attribute, wherein the user attribute includes at least one from a set of: a left or right handedness of a user, a size of fingers, and a size of tap action pointer associated with a pointing device;
display a textual tip associated with the selected one or more items, wherein the textual tip is positioned on one of an interior and an exterior of the context based menu; and
in response to one of: execution of a predefined command, a tap action away from the context based menu, a selection of a back button displayed on the context based menu, a scroll action, a zooming action, a selection of a different portion of displayed content, a new content entry, and selection of another user interface, hide the context based menu.

14. The computing device of claim 13, wherein items on the context based menu represent a current state comprising one or more of: a mouse hover, a keyboard focus, an item pressed, an item selected, a hover selected, an item disabled, a disabled hover, and a normal state.

15. The computing device of claim 13, wherein the processor is further configured to:
display a type of selected portion of the content to which the items on the context based menu apply.

16. The computing device of claim 13, wherein the application is one of a web-based application and a cloud-based application enabling a user to interact with content displayed through a browser on a client device.

17. The computing device of claim 13, wherein the context based menu has a radial shape, the items are displayed on hub and spoke style segments of the context based menu, and one or more links to submenus are presented at one of: near a center of the context based menu and along an outer radius of the context based menu.

18. A hardware computer-readable memory device with instructions stored thereon for providing a dynamic context based menu for a touch and gesture enabled device, the instructions containing:
in response to detecting one of: a selection of a portion of displayed content on a user interface, a tap action on an insertion point gripper, and an action associated with a launcher indicator on the user interface, presenting the context based menu at a dynamically selected location based on at least one from a set of: the selected portion of the displayed content, a displayed content type, available display area, user interface borders, a type of input, and a device type, wherein presenting the context based menu comprises:
in response to detecting one of: a limited available space on the user interface and empty segments on the context based menu, displaying a partial view of the context based menu; and
in response to detecting both of: the limited available space on the user interface and full segments on the context based menu, rotating the partial view of context based menu;
in response to detecting selection of one or more items from a plurality of items displayed on the context based menu, one of:
executing a command and
displaying a submenu associated with the selected one or more items by automatically arranging a layout of the items displayed on the context based menu based on a user attribute, wherein the user attribute includes at least one from a set of: a left or right handedness of a user, a size of fingers, and a size of tap action pointer associated with a pointing device;
displaying a textual tip associated with the selected one or more items, wherein the textual tip is positioned on one of an interior and an exterior of context based menu; and
in response to one of: execution of a predefined command, a tap action away from the context based menu, a selection of a back button displayed on the context based menu, a scroll action, a zooming action, a selection of a different portion of displayed content, a new content entry, and selection of another user interface, hiding the context based menu.

19. The hardware computer-readable memory device of claim 18, wherein each item displayed on the context based menu comprises one of a graphic object, a textual object, and a combination of graphic and text object, and wherein at least one from a set of: a color scheme, a graphical scheme, an animation scheme, and a shading scheme is employed to enhance a visual effect of the context based menu.

20. The hardware computer-readable memory device of claim 19, wherein the instructions further comprise: presenting one of an appearance, a presentation, and a disappearance of at least one from a set of: a context based menu launcher, the context based menu, items on the context based menu, and a submenu through an animation scheme.

\* \* \* \* \*